United States Patent [19]
George

[11] 3,961,417
[45] June 8, 1976

[54] METHOD OF AND MEANS FOR WINDING COILS FROM FOIL OR STRIP WHEN COILS HAVE SEVERAL TAPS

[76] Inventor: Howard A. George, Railroad Plaza, Oyster Bay, N.Y. 11771

[22] Filed: May 5, 1975

[21] Appl. No.: 574,541

[52] U.S. Cl. .............................. 29/605; 29/628; 228/4.5; 228/102; 228/103
[51] Int. Cl.² ........................................ H01F 41/10
[58] Field of Search .............. 29/605, 25.42, 628; 336/192; 228/4.5, 49, 102, 103

[56] References Cited
UNITED STATES PATENTS

| | | | |
|---|---|---|---|
| 3,283,225 | 11/1966 | Kalstein | 29/25.42 |
| 3,815,188 | 6/1974 | San Pietro | 29/25.42 |

*Primary Examiner*—Carl E. Hall
*Attorney, Agent, or Firm*—James P. Malone

[57] ABSTRACT

A machine for winding electrical coils from thin strip or ribbon, having a spindle on which the conductor is wound. A welding device welds intermediate or final terminations to the strip with predetermined spacing. The welding unit is mounted movably in relation to the winding spindle. Means are provided for precisely rotating the winding spindle and consistently stopping it at a fixed position. Means are provided for measuring precisely the length of one turn or known portion thereof so as to locate and weld the connection at a point that will cause it to fall in the required place when the connection has been wound onto the coil.

5 Claims, 3 Drawing Figures

METHOD OF AND MEANS FOR WINDING COILS FROM FOIL OR STRIP WHEN COILS HAVE SEVERAL TAPS

This invention relates to means for winding coils from foil, strip or tape and applying terminal taps at predetermined points.

As requirements for tracking of the foil and insulating material have tightened, there have been ready-made mechanisms from people outside of the winding industry which will handle this matter and they can be virtualy bolted on to any simple spindle which includes a motor drive and means of stopping at a predetermined count. Similarly, if taps or starting leads are required, it usually involves welding techniques which are generally outside the realm of knowledge of the normal wire winding machine manufacturer. This is quite different from the area of the design activity of those who manufacture the conventional wire winding machines because these units almost entirely involve matters which are unique to wire winding.

There is an area, however, of some complexity which is a real challenge and that has to do with the production of coils wound with foil and having a large number of taps. As specifications for coils become more rigorous, space and general physical dimensions must be held more closely and taps must be located precisely and each tap must be clearly differentiated as to position. Also, because of the tendency for the foil wound coil to have fewer turns, turns-count and the counts of fractional turns become increasingly important. Thus, while the simple foil winding machine in which the start and finish are brought out as extensions of the folded foil present little or no challenge, those machines which must produce many taps and weld dissimilar metals present problems of cleaning of the materials to be welded and insulating of the taps. In this application we shall attempt to look at the ultimate in winding machines. As we are just completing the first machine built to this new concept, we are pleased to note that this more sophisticated concept for tap placement probably is accommodated in a machine costing less than the less satisfactory approaches available earlier. Thus, we have equipment which is more flexible, more easily set up, and more accurate in its output while achieving what may prove to be sizable economies in the cost of the equipment itself With the increasing use of foil and particularly aluminum foil or similarly shaped strip conductors, there is an increasing need of equipment to produce relatively sophisticated windings. For our purposes, we are discussing coils which are wound not in layers but in what is essentially a spiral configuration in which the conductor is very wide in comparison to its thickness. The term "foil" is usually used for conductors thinner than 0.010 inch and the term "strip" is usually used to describe conductors of a heavier gauge. The conductor is not wound in a helix as are coils made from wire and this construction has many advantages but presents certain problems. Most of these problems have been the subject of papers preveiously published and it is assumed that those who are interested in this particular development already have a general understanding of the art.

Among the problems that have been solved in a variety of ways are those of flattening the edge of the foil, which is frequently irregular due to the slitting process, and the guiding and tensioning of the foil so as to preserve a precise edge relationship between the foil and the interleaving material, if such is used. Also, there is the necessity of counting turns precisely and winding a coil of maximum compactness and uniformity. These points in general having already been given much attention and for which generally a plurality of solutions is available are not the subject of this application.

We direct our attention particularly to coils having a multiplicity of taps or in which connections need to be introduced either at the start or the finish or particularly at intermediate points in the winding. Various means of attachment are available including pressure welding, heat welding or ultrasonic welding, but in every case the tap or lead cannot be attached "in loco" on the coil as it is wound. This is because of the nature of the attaching process which in general requires either that the conductor be clear of the coil so as not to damage the turns already wound, as in processes using heat for the welding, or that the conductor be exposed on both sides at the point of welding as is the case with pressure welding or ultrasonic bonding. Accordingly, some means must be devised to attach the lead to the conductor at a point remote from the winding arbor. This means of determining the proper point at which to make the weld is the subject of this invention.

It has been customary in the past to work out a program of welding with a fixed distance of approximately one turn of conductor between the winding arbor and the welding apparatus. It is obvious that the length of the turn increases as the diameter of the coil builds and is not an entirely predictable value. This is because the thickness of the insulation or of the conductor may vary as it comes from the mill and, what is probably a greater variable, is the fact that taps may have been introduced earlier in the program and these are subject to variation in the tap or even its proximity to the corner or center of the side of a rectangular or square winding. With such a multitude of variables, it is difficult to know in advance exactly where the weld should be. In current practice, an experimental program aided by the experience of the setup man works these details out and provides a very complicated program.

Usually a tape controlled machine seems to solve the problem best and the spindle is rotated a few degrees more with each tap to make up for the increasing size of the winding. The difficulty in working out a program can best be realized when one faces the requirement that with the fixed distance between the winding spindle and the welding station the spindle must be turned a few degrees farther for each increment of buildup of the coil size. Although we basically seek to adjust for this linear dimension between welding and winding, we make the adjustment in terms of degrees of rotation of the spindle and with the change in coil size this is a difficult requirement.

No matter how carefully this program is worked out, it is still subject to the variables mentioned above and once a winding has been committed to production the only practical way of adjusting for variations is to regulate the tension at which the winding takes place. All of this requires a high degree of skill and the use of a subjective judgment to have the taps fall in the desired location on the coil. If, because of change in material or specifications, a program must be changed even after it has been committed to tape, the cost and delay in production is considerable. These problems point out the desirability of having a way of programming the taps in such a winding without the need of punching tapes or doing experimental proving or testing. It is this problem that we feel requires a new look at the whole problem.

The problem can be solved if we can have the welding point always exactly the length of one turn of conductor from the winding spindle. Starting from this basis, it is apparent that the welding head needs to be capable of movement and the method of obtaining proper amount of movement is at the heart of this approach.

The principal object of the invention is to provide new and improved means for winding coils from foil, strip or tape, and apply terminal taps thereon in predetermined locations in the coil.

Another object of the invention is to provide new and improved means for winding coils from foil, strip or tape, by welding taps thereon in predetermined locations in the coil.

Another object of the invention is to provide new and improved means in a machine for winding electrical coils from thin strip or ribbon composed of a spindle on which the conductor is wound, means, of welding intermediate or final terminations to the strip with predetermined spacing comprising means for moving the welding unit in relation to the winding spindle, means for precisely rotating the winding spindle and consistently stopping it at a fixed position and means for measuring precisely the length of one turn or known portion thereof so as to locate and weld the connection at a point that will cause it to fall in the required place when the connection has been wound onto the coil.

Figures 1, 2:
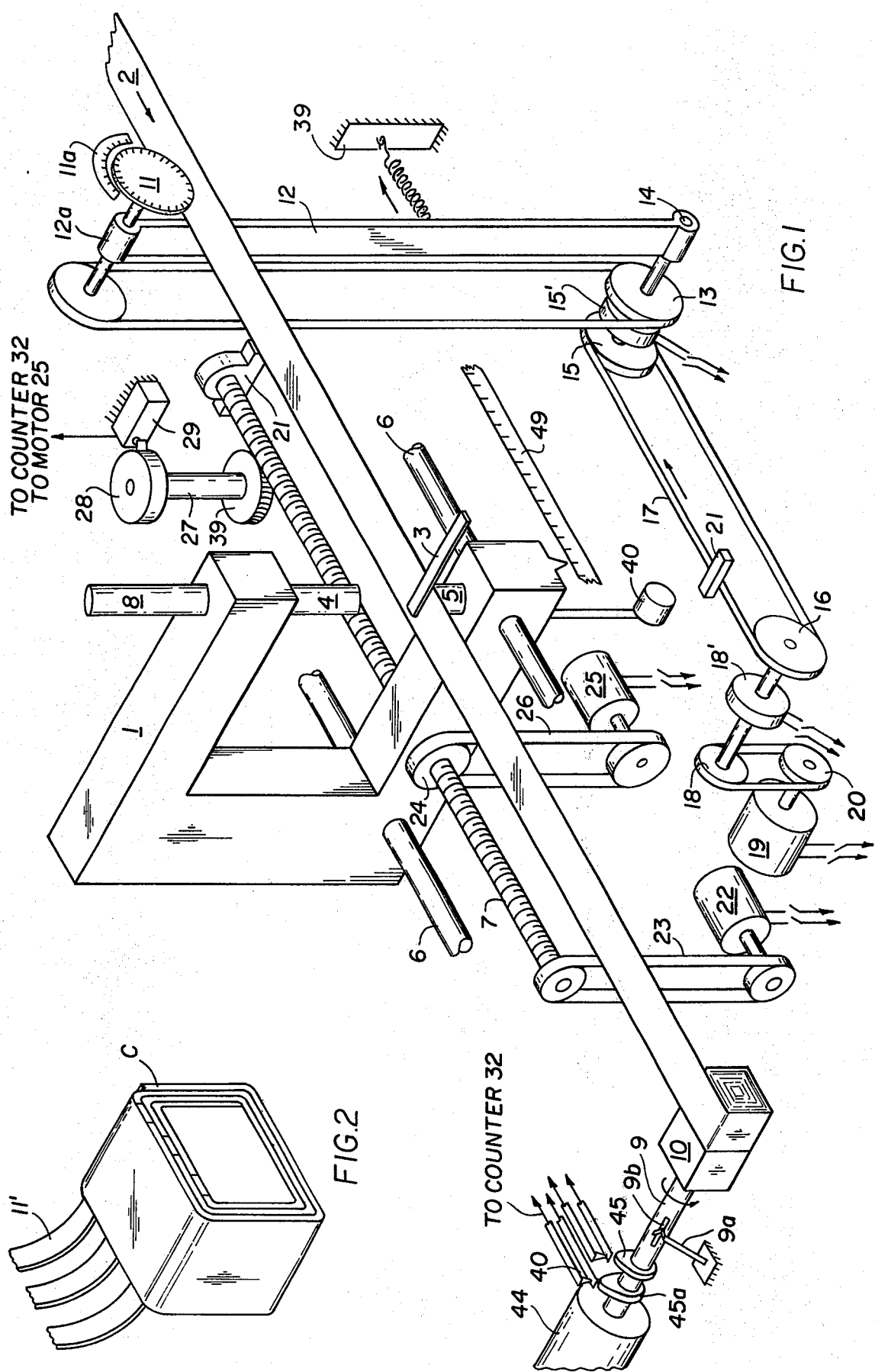
FIG. 1 is a perspective view of an embodiment of the invention.
FIG. 2 is a perspective view of a coil wound from strip or foil with terminal taps in predetermined locations as produced by the embodiment of FIG.F 1.

Referring to FIG. 1, the welding unit is on a carriage which is moved as required by a leadscrew so as to vary the distance from the welding point to the spindle. In this figure, the welding unit is represented by a substantial C-shaped bracket 1, which is supported freely on rails 6, with suitable bearings permitting it to move along the rails as it is propelled by the leadscrew 7. The foil 2, passes between the anvil of the welder 5, and the ram 4, which when the ram and anavil are closed on both the foil and the material for the tap 3, makes the desired attachment. The foil is drawn through the welder by the rotation of the spindle 9, producing a winding 10. It is the distance between the welding elements 4, 5 and the center of the spindle 9, that is varied in this invention.

It is now established that rather than vary the stopping point in this spindle ratation we can always bring the spindle to an exact position whenever we wish to make a termination or a tap. Accordingly, we can use any one of a variety of mechanical means of bringing the spindle into position including a shot pin or a detent 9a, acting on slot 9b, or ratcheting arrangement.

Referring again to FIG. 1, roller 11, has a rubberized perimeter and rides on the foil 2, as it is being wound. It is held in contact with the foil with sufficient pressure to cause it to revolve without slippage by the use of the pivoted arm 12, and the spring 39. Bar 12 is pivotally supported on shaft 14. Bar 12 mounts at its top the bearing 12a upon which wheel 11 is rotatably mounted. Spring 39 spring locks bar 12 and holds wheel 11, in frictional contact with foil tape 2. Wheel 11, becomes a measuring device which makes it possible to determine precisely the length of one turn so as to position the welder the axact distance from the winding spindle as is required for the proper placement of the welding lead 3.

FIG. 2, is a view of the end of the finished coil, C. Various welded connections 11', are shown emerging from the end of the winding. Note, that on the rectangular coil these taps generally fall on one side of the coil because of the physical requirements of the associated apparatus in which the coil is used. However, since they may be only a turn or two apart, it is necessary that they have some separation. This is generally accomplished by using a minimum of three rows as in this illustration so as to give separation and easy identification. In this approach to the placing of these taps, some provision must be made for entering the information into the programming means for this separation and accommodating it in the movement of the welder by use of leadscrew 7. The execution of this system can be acomplished in a variety of ways.

FIG. 1 illustrates a mechanical approach. The basic idea can be built into manually operated machines in which the measuring wheel 11, is the central and indispensable item. For example, the measuring wheel 11, can record a numerical value on on scale 11a for the proper location of the welding head 1. The welding head 1, can be manually positioned to a linear scale 49, using a pointer on the welding head and the head can be moved along until the pointer corresponds to the readout for the measuring wheel. It is only necessary then to stop the machine one turn early to engage the measuring wheel by bringing it into contact with the workpiece which can be the foil being wound as it approaches the welder or wheel 11, can actually ride on the coil itself.

Manual operation is as follows:

Assume it is desired to affix a second tap 1-½ turns after a first tap, and assume the perimeter of one turn is 2 inches.

Spindle 9, is turned exactly one turn and is stopped by the detent.

Measuring wheel 11 reads one turn + the distance added by thickness of the strip.

Assume wheel 11 turns 2 inches + 1/10 inch equals 2.1 inches

Welder 1, must be moved ½ turn = 1 inch + 1/10 inch equals 1.1 inches on measuring scale 49, away from the spindle to properly position the tap.

This basic manual system can be automated to varying degrees as required in particular applications as will be discussed.

Automatic operation is as follows:

In FIG. 1, the measuring wheel 11, is belted to an idler shaft 13 and pulley 15, mounted at the pivot point of arm 12, using a notched or toothed belt so that the idler 13, revolves precisely with sensing wheel 11. On the pivot shaft for the sensing arm 14, which carrier idler pulley 13, an additional pulley 15, drives a long toothed belt over an additional idler 16. The arrow represents the direction of passage of the conductor 2, under sensing wheel 11, and also the direction of movement of the long belt 17, over the various pulleys. A clutch 15' connects pulley 13, and pulley 15, so that belt 17, moves only on signal.

Accordingly, sensing wheel 1, turns at all times but the belt 17, moves on signal and the duration of the signal, for our purpose, is of exactly one turn of the coil being wound. Contacts 40 on shaft 9, make it possible for us to determine exactly the start and finish of the turn next preceding the welding operation.

Mounted on the same shaft as pulley 16, is an additional pulley 18, and the two pulleys are locked at will by an electric clutch 18'. Motor 19, can drive pulley 18 by signal by belt and pulley 20. Mounted on the long toothed belt 17 is a permanent magnet 21, which can move away from the spindle a distance equal to the full length of belt 17, if the clutch 15', connected to sensing pulley 11, is engaged and can be returned to its starting point by motor 19, and associated pulley and clutches.

In operation, motor 19, brings the magnet 21, on the belt 17, to a point vertically in line with the center of the winding arbor. For the most exact placement of the welded leads, it may be necessary to compensate for a small error arising from the fact that we are measuring the turn immediately preceding the one that affects the placement of the weld. This becomes increasingly important as the materials that we are working with become thicker. Thus, we would qualify the preceding statement regarding lining up vertically with the center of the spindle by modifying this position an amount approximately equal to the progressive increase in foil length from turn to turn. This increase in length is a constant except where a tap or other variable is introduced in the foil not yet would at the time of welding. Spindle 9, turns one revolution at a time and is stopped by detent 9a.

On signal exactly one turn before the tap is to be welded, the clutch 15' is engaged so that belt 17, is driven by sensing wheel 11. This causes the magnet 21, to move away from the center of the spindle a distance equalling one turn of conductor.

Mounted on the welding head itself and directly above magnet 21, is a switch 40, mounted on welding head 1, of a type actuated by the magnet. It should be understood that each successive turn will be longer than its predecessor and accordingly, magnet 21, always goes beyond the position that the welder was in for the previous weld. Thus, the welder 1, moves progressively to the right in this diagram so that it is only necessary when the machine comes to rest after measuring the length of the last turn before the weld, that the welding head 1, be then driven to the right by motor 22, until its position coincides with the measured length as indicated by the position of the magnet 21, and motor 22 is stopped by switch 40.

There are a variety of direct mechanical means that can accomplish the same purpose and the use of the magnet 21, and the switch 40, is only one solution to this part of the problem. Thus by the mechanism shown in FIG. 1, it is possible to place a tap directly on the centerline of the coil automatically with the only external information required being the number of turns to be wound preceding the tap.

The sequence then is for motor 19, to return the magnet 21, to the centerline of the spindle during the winding of the intervening turns following the previous tapping operation. One turn before the tap the clutch 15' is engaged. to drive the belt 17, to measure the length of the turn and at the completion of that exact turn the welding head moves to the right to place the tap at the proper location. In this application, we are referring to the welding position as being the tap location but it should be realized that in every case there is one less turn on the coil than the specified turn for the tap. This is taken care of at the outset of the winding since this condition exists for every tap and for the final termination as well.

Figure 3:
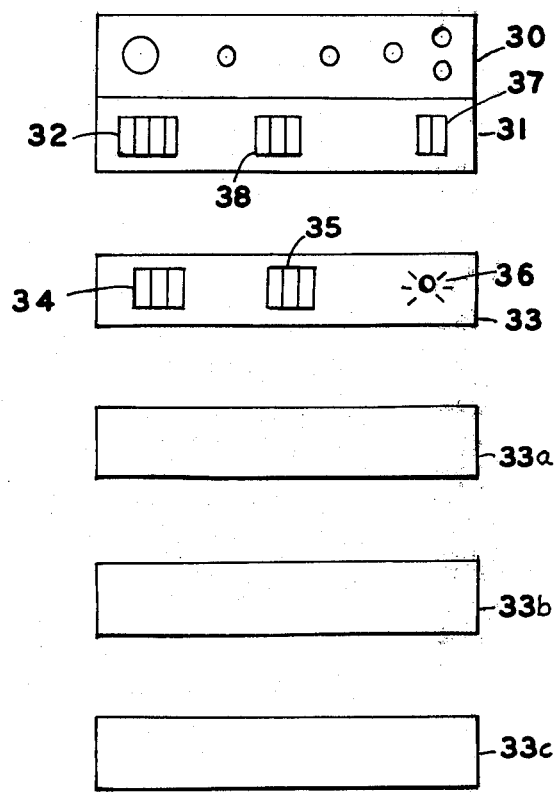
FIG. 3 is a schematic block diagram of control means.

To accomplish this, the turns counter 32, FIG. 3 has entered into its readout one turn before any winding begins. This turn on the counter corresponds to the piece of foil between the spindle and the welding head.

There are many ways of achieving the staggered tap placement shown in FIG. 2. FIG. 1 is essentially a mechanical one. Leadscrew 7, is rotated to drive the welding head 1, along the length of the screw as is required in the above discussion. The leadscrew is restrained from moving endwise by a thrust bearing 21. Motor 22, drives the leadscrew 7, through a suitable belt 23, or gears as is convenient. Motor 22, is reversible so as to return the welding head to the extreme left at the outset of the operation and likewise move the welder to the right in small steps as described above. The leadscrew drives the welding head in this fashion through what acts as a typical leadscrew nut attached to the frame of the welder 1. However, this nut 24, itself is free to rotate in the welding head and is restrained from moving along the leadscrew and held within the welder frame by suitable thurst bearing not shown. The nut can be rotated by motor 25, through belt and pulley arrangement 26. Thus we can move the welder at will by either motor 22 or 25. In operation, the nut 24, must be brought to a known position prior to the driving of the leadscrew and the positioning of the welder. This known position or centerline position is indicated in the following fashion. A worm wheel 39 is in contact with the leadscrew and drives a vertical shaft 27, which has attached to it a cam or indicating disc 28. This entire arrangement is identical to the conventional threading dial on a metal working lathe except that disc 28, has a multiplicity of cam surfaces or detents which actuate a similar number of switches 29, one of which is shown.

In practice, the arrangement of the detents or cams is such as to provide a wide selection of cam positions available to the control panel. Accordingly, if there are major alterations in turn length that connect be accommodated as discussed earlier, an alternative cam position can be selected experimentally to correct this unusual condition. Thus when the welder is on the centerline position, one of the switches 29, contacts a cam surface which indicates this position. Motor 25, first brings the leadscrew nut into its original locating position as indicated by the dial with detents 28, after which the entire welding head is moved into position indicated by the magnet 21, and associated measuring mechanisms. If a weld is made at this point, the lead would be on the centerline of the coil.

In the control panel, however, the information is included for each tap as to whether it is in one of the several positions possible to the right or left of the centerline. This desired position of the welding head is then reached by the use of motor 25. When it has been reached, this is indicated by the action of the appropriate switch 29, and suitable detent on wheel 28. In practice, there is preferably a group of switches 29, each of which with its associated detent indicates one of the optional positions for the leads in FIG. 2 and the associated circuitry instructs the motor 25 to position the welder as required and remain at this position. Likewise, motor 25, preferably automatically returns the welder to the centerline position after the weld is made and prior to or during the time required to wind the required turns to the next tap.

FIG. 3 covers the essentials of the electrical control panels. Panel 30, is a general control which is of a conventional nature. It contains among other things the speed settings for the various motors, the necessary power switches and, if appropriate, meters to show the settings for the various tensioning brakes or clutches as well as the means of adjusting these settings. These various details are handled in a strictly conventional way and are not a part of this invention.

Panel 31, has a counting group 32, which registers the number of turns that has been wound plus the turn represented by the piece of foil between the welder and the winding spindle. These counters have a provision for making electrical connections for each digit so that a predetermined number can be selected by thumbwheel switches or other means in panels 33, 33a–33c and beyond. In practice, for convenience there is a multiplicity of panels 33, one for each tap and a final one for the termination of the coil. All of these panels are identical and are connected so that they contain two sets of thumbwheels, the first 34, being typically for one turn less than the distance to the tap in question and another set 35, being preset for the actual stopping of the machine at the ultimate count.

In practice, there is a cam 45, on spindle 9, 180° away from the zero reference point. This cam causes counter 32, to add one count with each spindle rotation. When the count reaches the preset number on dials 34, the machine drive motor 44, is switched to low speed operation and it decelerates for a ½ turn interval, at which time another cam 45a, on winding spindle 9, indicates the zero spindle position. The spindle will not stop at the zero position because the count on predetermining wheel 35, has not yet been reached; but at this zero position the measuring wheel 11, and the associated clutch and belt arrangement shown in FIG. 1, is engaged and the measurement from this zero position until the next zero position is thus recorded by the movement of magnet 21.

At the 180° position of this last turn, the counter 32, has again been advanced by the cam 45, in the same fashion that it has for other counts. Accordingly, the preset 34, is reached at this moment but the machine is so programmed that it will continue to run until the exact zero position is reached as indicated by the cam 45, set at the zero degree position of the spindle. The programming circuit, not shown in panel 31, now initiates the driving of the leadscrew through motor 22, until the welding head has reached the centerline position and when this part of the program has been accomplished, motor 25, is actuated to select the tap position. The desired tap position has been preselected for the first of panels 33, by the rotary switch 36. The welding head is now in position for welding the lead at the proper place and the welding operation itself is a conventional nature, being one of the various methods mentioned earlier. During the welding operation, a signal is available which informs motor 19, to take the actuating magnet back to the centerline position of the spindle preparatory to making a new measurement when it is required. Immediately after the weld, motor 25, returns the reference cam to the centerline position as mentioned above. Thus, during or immediately after the winding period all components return to their initial position ready for a repeat of the cycle that has just been described. The motor control may be done manually but of course are preferably done automatically by conventional programming.

In panel 31, is a counter 37, similar to counter 32, but which counts the taps themselves. It preselects the various duplicate panels of type 33, progressively so as to actuate in sequence any number of panels necessary corresponding to the number of taps to be attached. Note, that all panels 33, are identical but carry new preset information which includes the point of slowdown and the point of stopping of the spindle plus the selection of the tap position as shown in FIG. 2. Suitable lights 36, and associated parts of a conventional nature indicate which of the multiplicity of panels 33, is currently actuated. The welding signal advances counter 37, which selects the next panel 33, containing the new tap information. Panel 31, includes a set of predetermining rotary switches 38, on which is indicated the total number of turns in the coil. Accordingly, when this count is reached, the machine will not continue to wind and an 'end' signal available at the welding of what is the final tap which indicates resetting all units to their position for the start of the next winding. Thus, while magnet 21, has returned to the start or centerline of the spindle with each tap, the welding head has not followed it but has merely advanced a small increment as the turns lengthen. On this 'end' signal which indicates the end of one complete coil and the start of the new one, the welding head returns to the extreme left toward the spindle itself and, if it were possible, would return to the centerline of the spindle. In practice, there is no way of going to the centerline nor is there any practical reason, therefore, since regardless of the coil size, the distance to the first tap is some distance removed from the centerline of the spindle at the time of welding.

We should give some consideration to special cases as they may arise. As inferred in the previous paragraphs, it may be desirable to bring the welding head extremely close to the winding spindle due to the short turn length in a small coil. If there is no clear indication as to where this is, the stop that limits are return of the welding head should bring it as close as is possible and then the measuring wheel for the first tap will indicate how far out one must go. However, note, that we have assumed that the welding head shall always move to the right so that it is important to reset it in preparation for a new coil as far to the left as possible. If it is not possible to get within one turn length of the spindle provision is made for a reference pointer to indicate where the starting tab on the foil should be located is at a point between the welder and the spindle.

This position is easily determined experimentally and the pointer or reference mark preset after which one or more taps can be located routinely before attaching the start of the foil to the winding spindle.

This is, of course, a special problem when the first tap is only one turn removed from the start. It is even more of a special problem if one must tap at 180° positions on the coil rather than on a 360° position location as assumed thus far in the discussion. Due to the nature of the laminations normally inserted in rectangular coils would of foil, there should never occur a case in which 90° or ¼ turn tap location exists. However, the means of accommodating ½ turns could easily accommodate ¼ turns by a simple adjustment in the machine.

In this paragraph, we shall discuss the 180° tap location problem. On the counting cam which is located on the spindle, let us now provide two switches, one which is at the zero spindle location and one of which is 180° removed. A selector switch can determine whether we are working in 180° increments (half turns) or in the full 360° full turn concept. If both switches are connected, the counter will register two counts per turn and all other functions of the machine will remain the same. This means that the measuring wheel 11, will be engaged for only 180° and the welding head, where necessary, will be positioned accordingly with a half turn lying between the welding head and the tap being wound. The procedures outlined in the previous paragraph become necessary to a greater degree. In the regard for a given coil size there will always be a certain irreducible length of foil between the centerline of the spindle and the welding head. Normally taps will be spaced several turns apart and therefore, there is no special problem at the start of the coil. On the other hand, the ideal location of the welding head cannot always be attained. This is overcome by the simple expedient of setting the presets 34, two turns (or in the case of 180° setting, two or more counts) ahead of the setting on 35. Accordingly, the measuring wheel will measure two turns and the welding head can be placed accordingly, at a position a greater distance from the centerline of the spindle without any further complication. Note, that the mechanism that places the taps to the right or to the left of the centerline functions whether half turns or full turns are used.

Incidentally, each of the panels with the predeterminations 33, has a switch on it to indicate that it is the last or terminating weld to be made. There may be a band of 10 or 20 predetermining panels and not all of them will necessarily be used. Accordingly, this switch is necessary to indicate the end of program and the overall resetting operations that are largely automatic and which were described above will occur when this particular panel is reached.

While we have discussed entirely mechanical solutions to the various problems, it should be evident that there are simpler mechanical solutions when somewhat more sophisticated electrical solutions are relied on. To a large degree, this has to do with the use of the leadscrew and associated parts as pointed out in FIG. 1. For example, the motor 25, and the rotating nut 24, can be replaced by a solid nut and only motor 22, used to position the welding head. Essentially, the two motors in FIG. 1, constitute a differential system in which the location of the welding head is the algebraic sum or difference of the motion imparted by the two motors. Particularly, if the signal from measuring wheel 11, is available in a digital form in which each unit is a small increment of foil movement, this digital information can be fed into an electronic device which is essentially a counter. Also, into this counter can be fed the information regarding the offset of the taps as outlined in FIG. 2. Thus, the leadscrew turns only the amount necessary to move the welding head to the reference point resulting from these two considerations. This eliminates the rotating nut and its drive. The counter has located the welding head for one tap. This position is held in its memory. The circuit compares the position of the welder with that desired for the next welding operation. Note, that motor 22, in some cases is required to turn the leadscrew in the opposite direction and so all of the information that is assimilated in the electronic circuitry results in telling motor 22, not only where to position the welding head but which way to turn to obtain that result. It is preferably that motor 22, now becomes a stepping motor which can assimilate and respond to the numerical information based on the small increments of foil feed measured by wheel 11.

At the outset in each coil, mottor 22, drives the welding head to the left as far as it can go and a numerical value for this position is stored in the memory. As the measuring wheel accumulates digitally pulses that would carry the welding head to the right, motor 22, picks up a signal when the position of the welding head has been reached and thereafter turns the leadscrew promptly at a rate to keep up with the added signals beyond the original welding head position. While this would eliminate any lost time between the measuring of the turn and the positioning of the welding head, there are problems in selecting the unit of measurement in the measuring wheel of the size to be compatible with the system. If these intervals of measurement are too large, then the taps will not be precisely lined up in the face of the coil. Fortunately, these errors would not be cumulative. The other part of the problem has to do with the fact that any acceptable unit of meaasurement (probably no larger than one millimeter) results in a large number of pulses within a given coil turn and this of course becomes a question of the frequency of the pulses based on the rate of spindle revolution. If the frequency of the pulses exceeds the response rate of motor 22, which is presumed to be a stepping motor, then errors can arise and it probably would be a matter of wisdom to have a separate visual readout on welding head position in case there should be some loss of signal for this reason. This problem can be solved by having the measuring pulses recorded on a differential counter and similar pulses from the leadscrew drive compared with this value. This bypasses the problem of motor 22, response time as the carriage can move at its optimum rate, and will stop when null is reached. With this system very small units of measure can be used. The mechanical system has been described more fully because it does not depend on units of measurement but has complete resolution for turn length and welder positioning.

This system with the variants that have been described in this application along with others that readily suggest themselves is compatible with every type of welding and is not dependent on the method of motor drive or tracking of the insulating or conductive materials. It is suitable for all types of coils and all types of machines. It is capable of accommodating additional features and alternatively can work on very simple equipment. Instead of the high degree of automation described herein, the basic idea can be built into manually operated machines in which the measuring wheel 11, is the central and indispensable item. For example, the measuring wheel 11, can record a numerical value on scale 11a for the proper location of the welding head 1. The welding head 1, can be manually positioned to a linear scale 49, using a pointer on the welding head and the head can be moved along until the pointer corresponds to the readout for the measuring wheel. It is only necessary then to stop the machine one turn early to engage the measuring wheel by bringing it into contact with the workpiece which can be the foil being wound as it approaches the welder or wheel 11 can actually ride on the coil itself.

In addition to simplication, there are many variations in the more automatic designs as well. For example, at the outset we pointed out the problems of variations in materials or tension that make tape control with its realtively inflexible program somewhat awkward. However, tape control is obviously the simplest way to get a repetitive program automated. While we have described a system that might require 10 or 20 predetermining panels, a single tape reader eliminates all of this circuitry and puts it all onto a piece of punched tape. However, the situation is quite different than in current practice since the tape merely needs to supply the information as to the slowdown point and the moment at which the clutches of the measuring wheel be engaged and also, the amount that the rotating nut 24, should be turned to the right or left to obtain the proper position of the welding head. Probably in this case, both motors 22 and 25, would become stepping motors. The real point of difference is that the tape can be cut with assurance that it will produce the correct winding. The measuring wheel and associated concepts make it only necessary to put into the tape a description of what is desired and no juggling or experimental work is necessary to determine how to accommodate properly variations in coil size and lead placement.

Finally, the extreme flexibility of the multiple panel installation described at the outset does involve a matter of cost consideration in the machine design as against the benefits of tape and dialed-in information. In the case of a single coil or a run of only two or three, the dial and switch control with the multiple panels has a great advantage. Even though a tape can be cut precisely with this new system without experimentation, it still is somewhat time-consuming operation; and unless separate facilities are available, there is no convenient way of knowing that the tape is right or may include some errors in itself. By the same token, the use of multiple panels as I have outlined requires care though no great skill in setting up the program. Also, it is very easy with the multiple panel arrangement to change the placement of one tap or the overall size of the coil. This is not that conventient with tape since generally a complete new tape would have to be cut.

As to the cost, we have determined at this time that up to six tap panels can be accommodated as cheaply as a tape reader. Beyond six panels, the tape reader is the cheaper approach if it is equally as acceptable. This should not rule out the possibility of putting a tape reader in as a supplement to the panels with option to use tape or manual settings at will; thus getting the best of both worlds.

Finally regarding the panel system, I should point out that it is possible to wind a coil many taps even if the number of panels is not sufficient to have a panel for each tap. This is accomplished by resetting the machine as though you were starting a new coil when the number of panels available had been exhausted. Frequently there is a repetitive pattern in the tapping and turns-count so that one might use the same panel over and over. For this purpose counter 37, can be disabled while one runs through a series of repetitions or counter 37, can be reset to a certain number and repeat a pattern. So much depends on the separate applications that generalizations are difficult. Obviously the machines at this stage of the art are built to specification using standard circuitry and generally standard components.

I claim:

1. In a machine for winding electrical coils from thin strip or ribbon composed of a spindle on which the conductor is wound; means for welding connections to the strip with predetermined spacing, means for moving the welding unit in relation to the winding spindle, means for precisely rotating the winding spindle and consistently stopping it at a fixed position, and means for measuring precisely the length of one turn of the coil, the welding being moved a distance dependent on the results of the measuring so as to locate and weld each connection at a point that will cause it to fall in the required place when the strip has been wound into a coil.

2. Apparatus as in claim 1, including measuring means for automatically doing the measuring and placing the welding head so as to position the connection automatically.

3. Apparatus as in claim 2, having means for moving the welding head to the right or left relative to the winding spindle as may be required for properly staggering the welded connections.

4. Apparatus as in claim 3, including programming means comprising a plurality of control switches and counters to wind a coil with a multiplicity of connections.

5. The method of winding electrical coils from thin strip or ribbon on a spindle and affixing taps to the strip with predetermined spacing with a movably mounted welding device comprising the steps of; rotating the winding spindle and consistently stopping it at a fixed position, measuring precisely the length of one turn of the coil and moving the welding unit in relation to the winding spindle a distance dependent on the results of the measuring, so as to locate and weld each tap at a point that will cause it to fall in the required place when the strip has been wound into a coil by the spindle.

* * * * *